United States Patent [19]
Hilliard et al.

[11] Patent Number: 4,663,883
[45] Date of Patent: May 12, 1987

[54] LAWN TRIMMING DEVICE

[76] Inventors: Lloyd D. Hilliard, P.O. Box 84; George D. Rudy, 838 Matthias Ave., NE., both of Massillon, Ohio 44646

[21] Appl. No.: 732,143

[22] Filed: May 9, 1985

[51] Int. Cl.⁴ .............................................. A01G 1/00
[52] U.S. Cl. ...................................................... 47/33
[58] Field of Search ..................... 47/33, 32; 404/7, 8; 188/32; 52/102, DIG. 3

[56] References Cited

U.S. PATENT DOCUMENTS

| | | | |
|---|---|---|---|
| 76,614 | 4/1868 | Faurot et al. | 404/7 X |
| 1,978,491 | 10/1934 | Gladman | 404/7 X |
| 2,713,751 | 7/1955 | Hendrixson | 47/33 |
| 3,281,988 | 11/1966 | Cohen | 47/33 |
| 3,378,949 | 4/1968 | Dorris | 47/33 |
| 3,619,944 | 11/1971 | Matvey | 47/33 |
| 3,803,760 | 4/1974 | Matvey | 47/33 |
| 3,957,383 | 5/1976 | Fridericks | 404/8 |
| 4,321,769 | 3/1982 | Tisbo et al. | 47/33 |
| 4,349,596 | 9/1982 | Hendrix | 47/33 X |

FOREIGN PATENT DOCUMENTS

| | | | |
|---|---|---|---|
| 3023309 | 1/1982 | Fed. Rep. of Germany | 47/33 |
| 2384896 | 11/1978 | France | 404/7 |
| 15258 | of 1910 | United Kingdom | 47/33 |

Primary Examiner—Robert A. Hafer
Assistant Examiner—Danton DeMille
Attorney, Agent, or Firm—Frease & Bishop

[57] ABSTRACT

A device for edging and trimming a lawn particularly around the base of a mobile home is disclosed which includes an elongated strip-like base member having an integral upstanding leg member and a second outwardly and downwardly extending flange which terminates a short distance above the base member. The flange is flexible and the assembly is adapted to be placed upon the ground on a lawn at a position where it is desired to trim the grass. A lawn mower may be moved along the base member to deflect the flange member inwardly toward the leg and cut the grass at the same height as grass throughout the remainder of the lawn. The device also includes means for locking the base and leg to the bottom of skirting which may extend around the periphery of the mobile home. The device is preferably formed from extruded PVC.

1 Claim, 5 Drawing Figures

LAWN TRIMMING DEVICE

BACKGROUND OF THE INVENTION

1. Field of the Invention

This invention relates generally to lawn trimming or lawn edging devices and more particularly to a lawn trimming guide which aids the trimming of grass around the edges of structures and the like with a power lawn mower.

2. Description of the Prior Art

Devices for assisting a gardener in trimming grass around areas where a neat appearance is desired are known in the prior art. These devices have assumed many forms and configurations. For example, devices have been proposed which comprise elongated members having several flange portions formed by a very generally inverted Y-shaped cross section. Such devices are embedded in the ground with one of the flanges or legs protruding from the ground. The portion embedded in the ground inhibits the lateral growth of grass roots, and that portion which projects above the ground level can be used to form the edge for whatever grass arrangement is desired to be provided. Such device is shown in U.S. Pat. No. 3,281,988.

Other devices include an elongated strip with a laterally projecting flange located intermediate and projecting from the elongated strip to form a base with a rigid hinged cover member mounted on the top edge of the elongated strip. A portion of the elongated strip is embedded in the ground and the laterally projecting flange rests upon the surface of the ground to inhibit the growth of grass underneath the strip. The hinged cover is normally in a closed position resting upon the lateral flange but may be swung out of the way to permit the mowing of grass with a lawn mower. Such device is shown in U.S. Pat. No. 2,713,751.

A still further device includes an elongated member which in cross section resembles an inverted "J". The long leg of the "J" may be embedded in the ground with curved portions projecting over the area of the grass which is desired to be edged. A device of this type is shown in U.S. Pat. No. 3,378,949.

Each of the aforementioned devices requires that at least a portion of the device be inserted or embedded in the ground at the position where the device is to be used. Thus, it is necessary to install the device by digging a trench in the ground and placing the device in the trench. If it is desired, for one reason or another, to remove the device, additional labor is required to dig the embedded portions of the device from the ground.

Further, many of these devices are made of elongated strips of sheet metal which will eventually deteriorate in appearance over a period of time either through use, corrosion or other causes. If painted, the paint will eventually be chipped through rough use, with the result that the device must be repainted or remain unattractive.

One particular place where a device for assisting in trimming grass is desirable is around the base of mobile homes. Mobile homes are commonly provided with what is known in the trade as "skirting", which is a decorative panel type structure which extends around the perimeter of the base of the mobile home and the ground upon which the mobile home is located. This skirting is designed to hide the unattractive appearance of the wheels and bare ground which is present underneath the mobile home, that is, between the underside of the flooring and the ground. The skirting is usually formed of panels of sheet aluminum or plastic, and it is a difficult job to trim grass which may grow up to the edge of the bottom of the skirting.

Accordingly, a need exists for a device for use by a home owner, gradener, and in particular for residents of mobile homes, which facilitates providing an attractive lawn with well defined and neatly trimmed edges next to the skirting of a mobile home, and in addition may be used adjacent to curbs, sidewalks, walls and other structures, flower beds, driveways and the like; which device is simple to manufacture and easy to install in place; which may be readily moved, and which maintains a good aesthetic appearance over an extended period of time; and which may be manufactured in a wide range of colors if desired.

SUMMARY OF THE INVENTION

Accordingly, it is primary object of the present invention to provide a lawn edging device which is easily installed adjacent to the skirting of a mobile home and may be used to form a neat trimmed appearance where the skirting of a mobile home extends down to the lawn area around the mobile home.

It is a further object of the present invention to provide a lawn edging device which may be manufactured from extruded plastic material which can be manufactured in substantial length and cut to any desired length to provide a lawn edging device that may be readily installed at any desired position or location on a lawn.

It is a still further object of the present invention to provide a lawn edging device which provides a guide for a lawn mower so that grass may be cut or trimmed adjacent to the device to provide a neat and trim appearance.

A still further object of the present invention is to provide a lawn edging device which is manufactured from elongated material and which includes a base portion, an intermediate upstanding leg, and a downwardly curved flap or flange or hood portion which will present a neat and attractive appearance.

A still further object of the present invention is to provide a lawn edging device in which a lawn may be trimmed at the same time as it is mowed with a lawn mower without requiring the use of a hand trimming device or other additional equipment.

These and other objects and advantages will be apparent from the following detailed description when taken in connection with the various figures of the accompanying drawing.

BRIEF DESCRIPTION OF THE DRAWING

Preferred embodiments of the invention—illustrative of the best modes in which applicants have contemplated applying the principles—are set forth in the following description and shown in the drawing, and are particularly and distinctly pointed out and set forth in the appended claims.

In the drawing.

Similar numerals refer to similar parts throughout the drawing.

DESCRIPTION OF THE PREFERRED EMBODIMENTS

Figure 1:
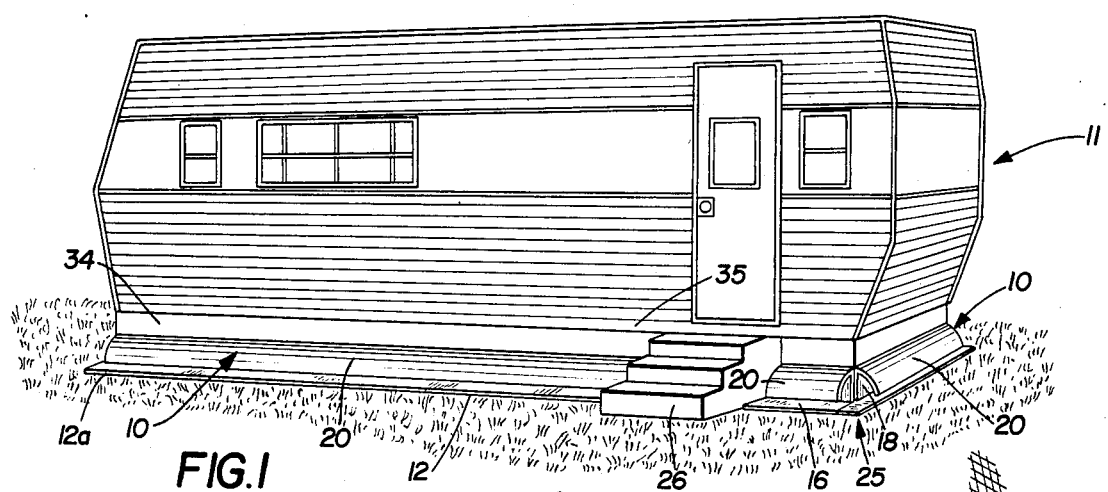
FIG. 1 is a perspective view illustrating a mobile home or the like having the lawn edging device of the present invention installed around the perimeter of the mobile home.

The improved lawn edging device of the present invention is illustrated generally at 10 and is shown in a first embodiment in FIGS. 1 through 3 and 5.

Device 10 is manufactured from an elongated extrusion of suitable plastic material such as PVC (polyvinylchloride) and includes a strip-like base portion 12 which rests upon the ground in a desired location. Base 12 includes a bottom surface 14 and top surface 16. A leg member 18 extends upwardly from base 12 and is coextensive with base 12. The device also includes an integrally connected downwardly curvd flexible hood or flange 20, which is also coextensive with base 12 and leg 18.

Referring specifically to FIG. 1, the device is shown installed around the perimeter of a mobile home 11 or similar structure. The device may be furnished in extended lengths and cut with a saw, knife or scissors to fit the periphery of the structure. The cut to desired length pieces are placed upon the ground and positioned around the perimeter of a mobile home 11, as shown in FIG. 1. This cutting and fitting procedure may be used to position the device in any desired location.

The lengths of the device which are cut may be trimmed so that a corner intersection 25 will mesh together to present an attractive appearance. Likewise, the device may be cut to fit adjacent a structure, such as steps 26, that may lead into a building to present an attractive appearance.

Figure 4:
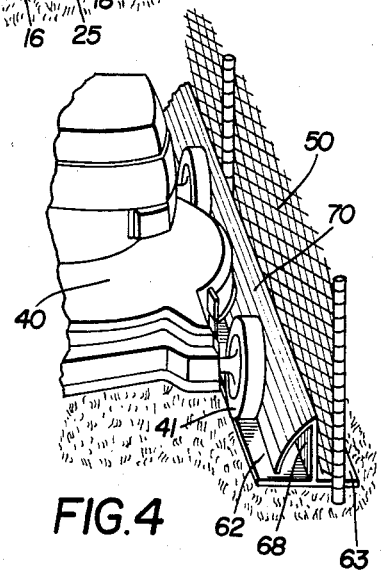
FIG. 4 is a fragmentary perspective view showing the manner in which a lawn mower may be moved along the edging device of the present invention.
Figure 3:
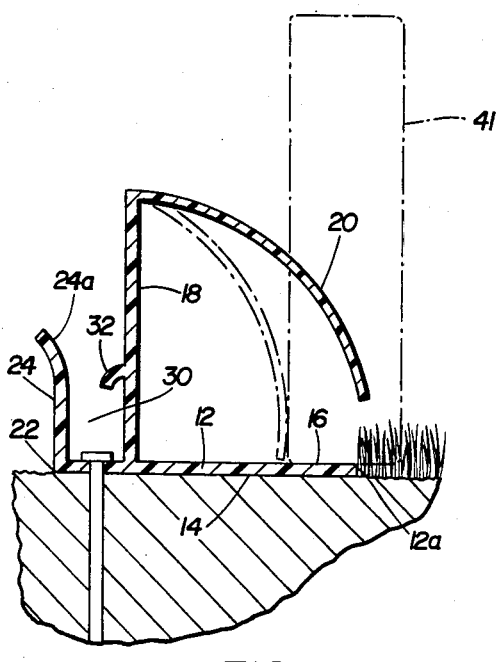
FIG. 3 is a vertical cross section illustrating the lawn edging device of the present invention in normal position in full line; and with the wheel of a lawn mower deflecting the guide flange of the device illustrated in dotted lines.
Figure 5:
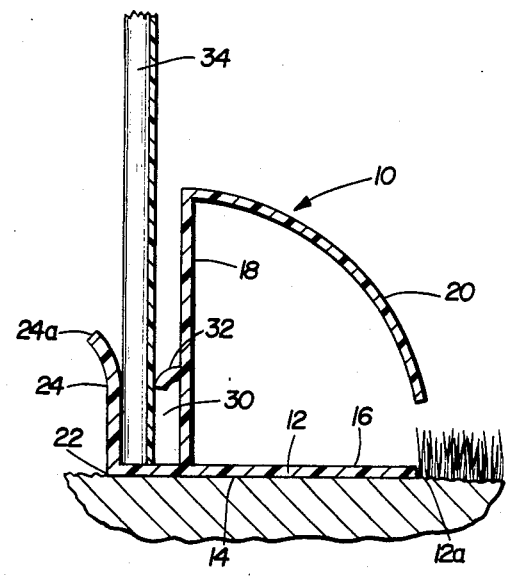
FIG. 5 is a vertical cross section illustrating the lawn edging device of the present invention with the bottom edge of a mobile home skirting member located in the channel formed by the flanges of the device of the present invention.

After the device 10 has been placed upon the ground with the bottom surface 14 of the base 12 resting upon the ground, the grass underneath this surface 14 will have its growth inhibited. However, the grass will grow in a normal manner adjacent to the outside edge 12a, as shown in FIG. 5. When a mobile home owner or gardener mows his lawn, he can present a neat and trim appearance along the edges where the device of the present invention is used by moving a lawn mower along the length of the device. As seen in FIGS. 3 and 4, the wheels of the mower will move along the top surface 16 of base 12 and deflect flange member 20 toward leg 18, as shown in dotted lines in FIG. 3, so that the grass growing adjacent to edge 12a will be trimmed to a height the same as the grass growing in other portions of the lawn. The edge 12a will thus automatically provide a straight and neat edge.

Figure 2:
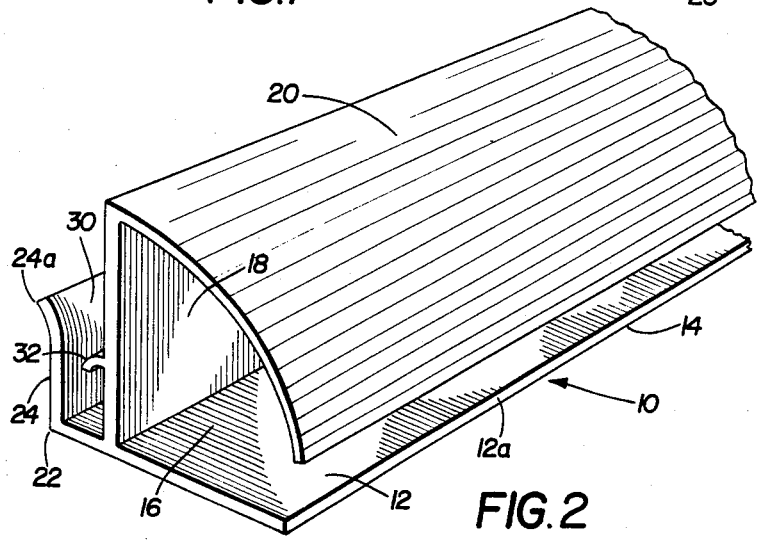
FIG. 2 is an enlarged fragmentary perspective view of the lawn edging device of the present invention.

In the improvement shown in FIGS. 2 through 4, the leg 18 extends upwardly from the top surface 16 of base 12 from a position between edge 12a and the opposite edge 22 of base 12. A second shorter leg 24 is provided which is coextensive with base 12 and leg 18. The upper edge of leg 24 is flared away from leg 18 at 24a to define groove 30 which is wider at the top than at the bottom.

The device also includes a hook flange 32 which projects outwardly and downwardly from leg 18 toward leg 24. Flange 32 is located, as shown most clearly in FIG. 3, in the groove 30 defined by base 16, leg 18 and leg 24.

A preferred mode of use for the device of the present invention is in connection with a mobile home 11 that includes skirting. In FIG. 1 a mobile home is illustrated with skirting 34 mounted around the perimeter of the bottom area 35 of the home 11. This skirting 34 will hide the unsightly appearance presented between the floor of the home 11 and the ground upon which the home 11 is located. The skirting thus extends between the bottom of mobile home 11 and the ground and adds to the attractive appearance of the home 11 by lending a look of permanence to the structure.

To aid in the presentation of an attractive appearance the grass or lawn growing around the mobile home 11 must be neatly trimmed. To facilitate trimming with a lawn mower 40, device 10 is placed around the perimeter, as indicated above, skirting 34 (FIG. 5) is placed or mounted in groove 30 between flange 24 and hook flange 32—leg 18. The distance between flange 24 and the closest point of hook flange 32 is slightly less than the width of skirting 34 so that skirting 34, which extends from the bottom of mobile home 11 to the ground, will retain the device of the invention in proper position upon the ground around the perimeter of the home 11.

When it is desired to mow the lawn around home 11, trimming can be very easily accomplished by moving lawn mower 40 along device 10 with mower wheels 41 rolling on top surface 16 of base 12. Wheels 41 will deflect hood flange 20 toward leg 18 so that the mower blade (not shown) will cut the grass growing adjacent to edge 12a. The whole lawn can thus be cut at a uniform height by using a power mower and hand trimming will not be required.

FIG. 4 illustrates a second embodiment of the invention which may be used with advantage along fencing 50 or the like. In this embodiment the devices include base 62, upstanding leg 68 and hood flange 70, each of which correspond to the same components described in connection with the device shown in FIGS. 1-3 and 5. To position the device of FIG. 4, suitable lengths of device 10 are cut to length and positioned upon the ground along fence 50 with a portion 63 of base 62 extending under the bottom of fence 50 between the fence and the ground. The device may, if desired, be retained in place by spikes or other suitable retaining means (not shown). A mower 40 may be used to trim the grass along fence 50 in a manner similar to that described above.

In accordance with the present invention the device 10 is manufactured in one integral extrusion of polyvinylchloride. Therefore, base 12, leg 18, hood flange 20, flange 24 and hook flange 32 are all part of a unitary integral member and are extruded at the same time. While many plastics could be used in making device 10, we have found that a product identified as GEON 85857 manufactured by the B. F. Goodrich Co. of Akron, Ohio is preferred as the polyvinylchloride for manufacturing device 10.

We have found that the various components of the device are best fabricated with certain thicknesses to best achieve the objects of the invention. Thus, the thickness of base 12, leg 18, leg 24 and flange 32 is preferably 0.045 inches, while flange 20 is preferably 0.025 inches thick. This relationship of thickness will provide the necessary rigidity to base 12, leg 18, leg 24 and flange 32 while providing the desired amount of flexibility to flange 20.

An important aspect of the invention is the provision of a device which includes an elongated, flat, sheetlike base member having an upstanding coextensive vertical oriented leg together with a coextensive downwadly curved flange. This provides many advantages. For example, when the device is placed in the installed position, one edge of the base will provide a nice, neat and attractive edge and the downwardly curved flexible flange member provides a device for presenting an attractive appearance, while at the same time providing a means whereby a lawn mower may be moved along the length of the device to mow the grass so that all the grass in the lawn may be mowed to a uniform height.

Another important aspect of the invention involves the relative positioning of the base member, the upstanding member and the downwardly projecting flange. While any of the dimensions of these various component parts can be determined to meet the particular needs of the situation, the downwardly curved flange is of a preferred dimension so that it terminates at a position slightly above one edge of the base member to provide a compact yet functional edging device.

Accordingly, the edging device construction of the present invention provides an inexpensive and effective and efficient device which achieves the enumerated objectives and provides a convenient and easy to use device for providing a uniform and attractive edge for a lawn at those places where such an appearance is desired, such as around the perimeter of a mobile home.

In the foregoing description, certain terms have been used for brevity, clearness and understanding; but no unnecessary limitations are to be implied therefrom beyond the requirements of the prior art, because such terms are used for descriptive purposes and are intended to be broadly construed. For example, the device has been referred to interchangeably as a lawn trimming device or a lawn edging device.

Moreover, the description and illustration of the invention is by way of example, and the scope of the invention is not limited to the exact details shown or described.

Having now described the features, discoveries and principles of the invention, the manner in which the lawn edging device is constructed and used, the characteristics of the construction, and the advantageous, new and useful results obtained; the new and useful structures, devices, elements, arrangements, parts, and combinations are set forth in the appended claims.

We claim:

1. A lawn trimming device construction including an elongated striplike base member having top and bottom surfaces and first and second edges, an elongated integral upstanding leg member extending upwardly from the top surface of the base, said leg member having first and second opposed surfaces terminating in an upper edge, said leg member extending upwardly from the upper surface of the base at a position intermediate the two edges of the base member, an integrally formed outwardly and downwardly curved hood flange member extending from the upper edge of the leg and terminating in an outer edge at a position above the first edge of the base member and outwardly from said first leg member surface, the bottom surface of the base member being adapted to be positioned upon the ground, said hood flange member being flexible and deflectable toward said first leg member surface and said base member top surface, a second leg member extending upwardly from the second edge of the base to define a groove with said base and said upstanding leg member, said second leg terminating in an upper edge, said upper edge being flared outwardly away from said second leg member, a hook flange member extending from the upstanding leg member opposed surface outwardly and downwardly toward the base member and being located within the groove formed by the upstanding leg, base and second leg member at a position opposite the flared edge of the second leg, said groove being adapted to receive the skirting of a mobile home whereby said hook flange means will engage skirting located within the groove, and means for securing said base member to the ground.

* * * * *